United States Patent [19]

Valette et al.

[11] Patent Number: 4,810,065

[45] Date of Patent: Mar. 7, 1989

[54] HIGH-FREQUENCY LIGHT POLARIZATION MODULATOR DEVICE

[75] Inventors: Pascale Valette, Paris; Catherine Gueugnon, Lyons, both of France

[73] Assignee: Bull S.A., Paris, France

[21] Appl. No.: 71,375

[22] Filed: Jul. 9, 1987

[30] Foreign Application Priority Data

Jul. 11, 1986 [FR] France ................................. 86 10210

[51] Int. Cl.$^4$ .............................................. G02F 1/09
[52] U.S. Cl. .................................... 350/355; 350/375
[58] Field of Search ............... 350/355, 375, 376, 377, 350/378; 360/110

[56] References Cited

U.S. PATENT DOCUMENTS

| | | | |
|---|---|---|---|
| 3,502,978 | 3/1970 | Bernard et al. | 350/377 |
| 3,752,563 | 8/1973 | Torok et al. | 350/375 |
| 4,228,473 | 10/1980 | Himuro et al. | 350/375 |
| 4,434,212 | 2/1984 | Robertson et al. | 365/33 |
| 4,510,544 | 4/1985 | Lazzari | 360/114 |
| 4,514,082 | 4/1985 | Gueugnon et al. | 355/54 |
| 4,609,257 | 9/1986 | Shirasaki | 350/355 |

FOREIGN PATENT DOCUMENTS

| | | |
|---|---|---|
| 0077693 | 4/1983 | European Pat. Off. . |
| 0086387 | 8/1983 | European Pat. Off. . |
| 1387866 | 12/1964 | France . |
| 1547812 | 10/1968 | France . |

OTHER PUBLICATIONS

Hunt et al., "Optical Scanning for a Magneto-Optic Memory", *J. Applied Physics*, vol. 41, No. 3, Mar. 1970.
IEEE Transactions on Magnetics, vol. MAG-8, No. 3, Sep. 1972, pp. 528-530, S. G. Zaky, "Dynamic Detection of Farday Rotation".
Review of Scientific Instruments, vol. 55, No. 5, May 1984, pp. 743-746, American Institute of Physics, R. M. Duffy et al, "Design of Farday Rotators and Modulators".
Thin Solid Films, vol. 114, No. 2, Apr. 1984, pp. 187-219, P. Paroli: "Magneto-Optical Devices Based on Garnet Films".

*Primary Examiner*—Eugene R. Laroche
*Assistant Examiner*—Nathan W. McCutcheon
*Attorney, Agent, or Firm*—Kerkam, Stowell, Kondracki & Clarke

[57] ABSTRACT

In a high-frequency light polarization modulating device including a source of polarized light (SL), a generator (BOBI) of a periodic magnetic field ($H_p$) having a pulsation ($\omega$) and a magnetooptical garnet (GRI) receiving the beam ($F_i$) emitted by the source and the field ($H_p$), in order to produce a beam ($F_{mi}$) of modulated polarized light, the invention provides that the generator (BOBI) comprises a microcoil disposed on the garnet in such a manner as to produce a magnetic field perpendicular to it. The garnet (GRI) is monocrystalline, in thin layers, and anisotropic, and its direction of easy magnetization is perpendicular to its plane. The invention is applicable to magnetooptical memories.

8 Claims, 4 Drawing Sheets

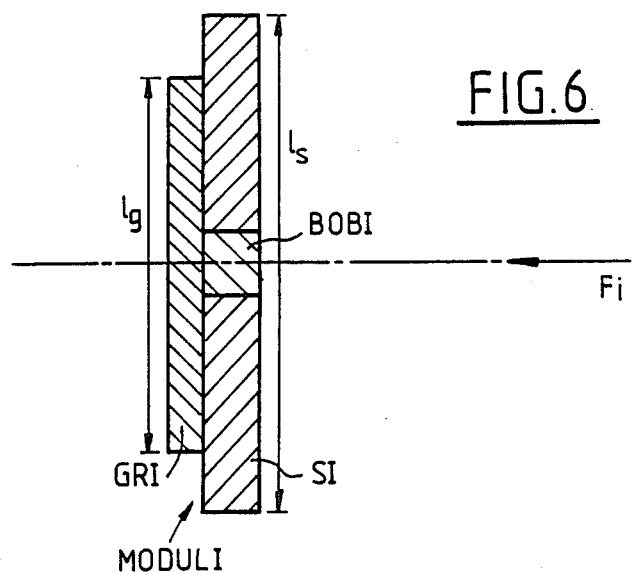
FIG.6
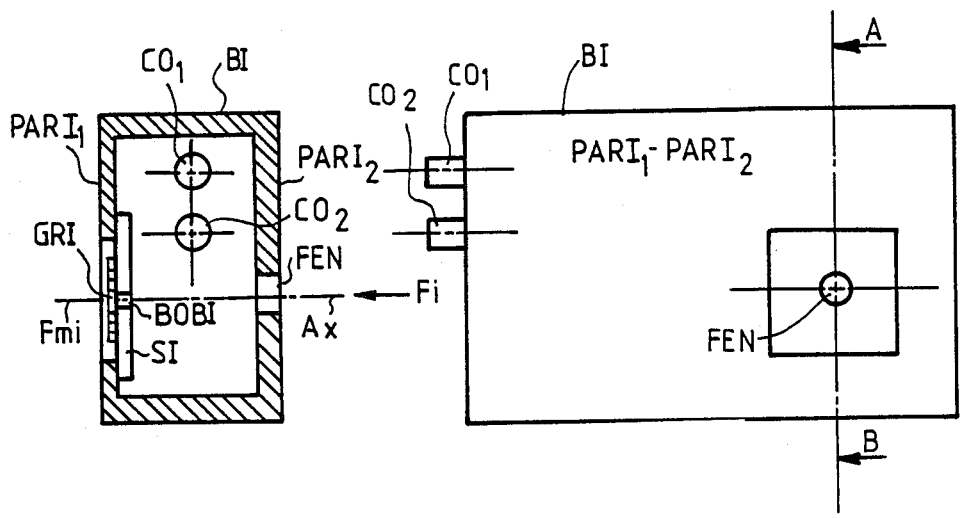
FIG.7
FIG.7a   FIG.7b

HIGH-FREQUENCY LIGHT POLARIZATION MODULATOR DEVICE

FIELD OF THE INVENTION

The present invention relates to a high-frequency light polarization modulator device. More particularly, it relates to optoelectronic data reading devices for magnetooptical disk memories.

BACKGROUND OF THE INVENTION

In magnetooptical disk memories, the data are known to be carried by magnetic disks and read by optoelectronic devices. The radial and longitudinal recording densities of these memories are on the order of 10,000 tracks per cm and 10,000 data per cm, respectively. (Radial density is the number of tracks per unit of length, measured along the diameter of the disk, while longitudinal density is the number of data per unit of length, measured along the circumference of a track.)

The functioning of magnetooptical disk memories is based on the magnetooptic effect, which is characteristic of certain magnetic materials, in particular alloys that include a metal such as iron, cobalt or chromium and one of the metals of the heavy rare earth group such as terbium, gadolinium or dysprosium.

This effect involves the interaction of a rectilinear polarizer light with the magnetic state of the material. It can occur by transmission of the light through the material, in which case the magnetooptic effect is known as the Faraday effect, or by reflection on the recording material, in which case it is known as the Kerr effect.

The interaction of a rectilinear polarized light with the magnetic state of the material comprising the magnetic recording medium causes the rotation of the electrical field vector in the plane perpendicular to the direction of propagation of the light, or the rotation of the plane of polarization of the light, which includes both this electrical field vector and the direction of propagation.

If the Kerr effect is operative, it is observed that after the reflection of the incident beam of light on the magnetooptical material, the electrical field vector of the light undergoes a rotation, which is conventionally said to equal an angle $-\theta$ when the light beam encounters a negatively magnetized domain (by convention) and to equal an angle $+\theta$ when the beam encounters a positively magnetized domain (again by convention).

It is apparent that to read the data recorded on a magnetic medium for magnetooptical recording, it is sufficient to detect either the rotation of the electrical field vector or the rotation of the plane of polarization of the light. This is done by means of a light analyzer disposed such that if the light is reflected onto a negatively magnetized magnetic domain, a light of zero intensity is collected at its output, and if the light is reflected onto a positively magnetized magnetic domain, a light of non-zero intensity is collected. By placing one or more photoelectronic transducers, also known as photodetectors, behind the light analyzer, a zero voltage signal is received at the output of these detectors for a negatively magnetized magnetic domain, and a non-zero voltage signal is received for a positively magnetized magnetic domain.

A more detailed discussion of the manner in which the data in a magnetooptical memory are read is provided in U.S. Pat. No. 4,510,544.

Magnetooptical angles of rotation ($\theta$) are generally small, and consequently the difference in light intensity between a light of zero intensity and a light of non-zero intensity at the output of the analyzer is very slight. As a result, the signal collected at the output of the photodetector is slight, and so the signal includes a relatively large proportion of noise.

To improve the signal-to-noise ratio in reading, it has been proposed in current practice to modulate the polarization of the beam of light aimed at the magnetooptical material, for example as described in the article, "Dynamic detection of Faraday rotation" by Safwat G. Zaky, in IEEE Transactions on Magnetics, September, 1972.

A beam of light is polarized by making the plane of its polarization oscillate by an angle $\theta' = a \sin \omega t$ about a mean position. At the output of the analyzer and of the photoelectronic detectors, a carrier beam of light is detected, the amplitude of which is proportional to the rotation $\theta$ of the plane of polarization of the light caused by its reflection onto the magnetic material comprising the recording medium. By disposing filtering means and amplifiers at the output of the photodetectors, the continuous levels are eliminated, thereby cutting off the noise they contain, that is, the noise due to the photodetectors, to fluctuations in the power of the laser emitter of the polarized light, to dust, to scratches on the polarizers and analyzers, and to defects that the beam of light may encounter, for example on the magnetooptical disk.

The advantages mentioned above supplement the known improvement in the signal-to-noise ratio attained by using a modulated signal.

Known devices for modulating the polarization of light are described, for example, in the thesis entitled "Modulation de polarisation avec des grenats magnetooptiques" [Polarization modulation with magnetooptical garnets"] by Ms. Pascale Valette, which was submitted for an advanced degree in materials science and defended in June 1984 at the University of Paris VI. One such device associates a periodic magnetic field generator having a pulsation $\omega$ with a magnetooptical garment that is transparent to light, the magnetization of which is parallel to its surface and the magnetooptical properties of which are based on the Faraday effect. The periodic field is sent to the garnet with an incidence $\alpha$ not equal to 90°.

When the magnetic field having the pulsation $\omega$ is sent to the magnetooptical garnet, the magnetization in the garnet changes direction periodically (it is understood that the intensity of the magnetic field is greater than the coercive field of the material comprising the magnetooptical garnet). It follows that the angle of rotation of the plane of polarization of the light (due to the Faraday effect) sent to the magnetooptical garnet simultaneously with the magnetic field will itself vary periodically, with a pulsation close to the pulsation $\omega$. After having passed through the mangetooptical garnet, the beam of polarized light undergoes a rotation $\theta'$ due to the magnetooptical effect (equal to $a \sin \omega t$) of its plane of polarization with respect to the plane of polarization of the incident beam sent to the surface of the magnetooptical garnet.

The major disadvantage of this type of modulator device is that it can function only at low frequencies, and so to read the data in magnetooptical disk memories having the aforementioned high recording densities, the polarization of the light must be modulated with very high frequencies. In fact, the data reading output of magnetooptical memories of very high recording density is on the order of one to several tens of millions of data per second, which corresponds to reading frequencies of several tens of a megahertz. For the modulated beam of light to be a carrier, its frequency must be at least double the reading frequency, and hence must be on the order of several tens of a megahertz.

Yet the light polarization modulator devices of the type known in the art, as described above, cannot function at frequencies higher than a maximum of 100 kilohertz.

OBJECT AND SUMMARY OF THE INVENTION

It is the object of the present invention to overcome these disadvantages, and so the invention relates to a high-frequency light polarization modulator device that can be used in optoelectronic reading devices for magnetooptical memories at frequencies of several megahertz, and even several tens of a megahertz.

According to the invention, the high-frequency modulator device for polarized light includes:
- a source of polarized light emitting a beam of incident polarized light;
- a periodic magnetic field generator having the pulsation $\omega$;
- and a magnetooptical garnet receiving the beam of polarized light and the periodic magnetic field, producing a beam of modulated polarized light that has undergone a rotation $\theta'$, equal to a $\sin \omega t$ of its plane of polarization with respect to the plane of polarization of the incident beam,
- and is characterized in that the generator comprises a microcoil disposed on the magnetooptical garnet in such a manner as to produce a magnetic field perpendicular to it, the magnetooptical garnet being monocrystalline in thin layers and being magnetically anisotropic with its direction of easy magnetization perpendicular to its plane.

Further characteristics and advantages of the present invention will become apparent from the ensuing detailed description, given by way of non-limiting example, taken in conjunction with the drawings.

BRIEF DESCRIPTION OF THE DRAWINGS

FIG. 6 shows a preferred exemplary embodiment of the light polarization modulating device according to the invention; and FIG. 7, including FIGS. 7a and 7b, shows how the modulator according to the invention is mounted inside a case.

DESCRIPTION OF THE PREFERRED EMBODIMENT

The light polarization modulating device according to the invention, and its function, will be better understood after first reviewing the magnetooptical effect, the reading of data recorded on magnetooptical media, optoelectronic equipment for reading these data, and the modulation of light polarization. This review will be illustrated by FIGS. 1, 1a, 1b, 2 and 3.

Review of the Magnetooptic Effect

Figure 1A:
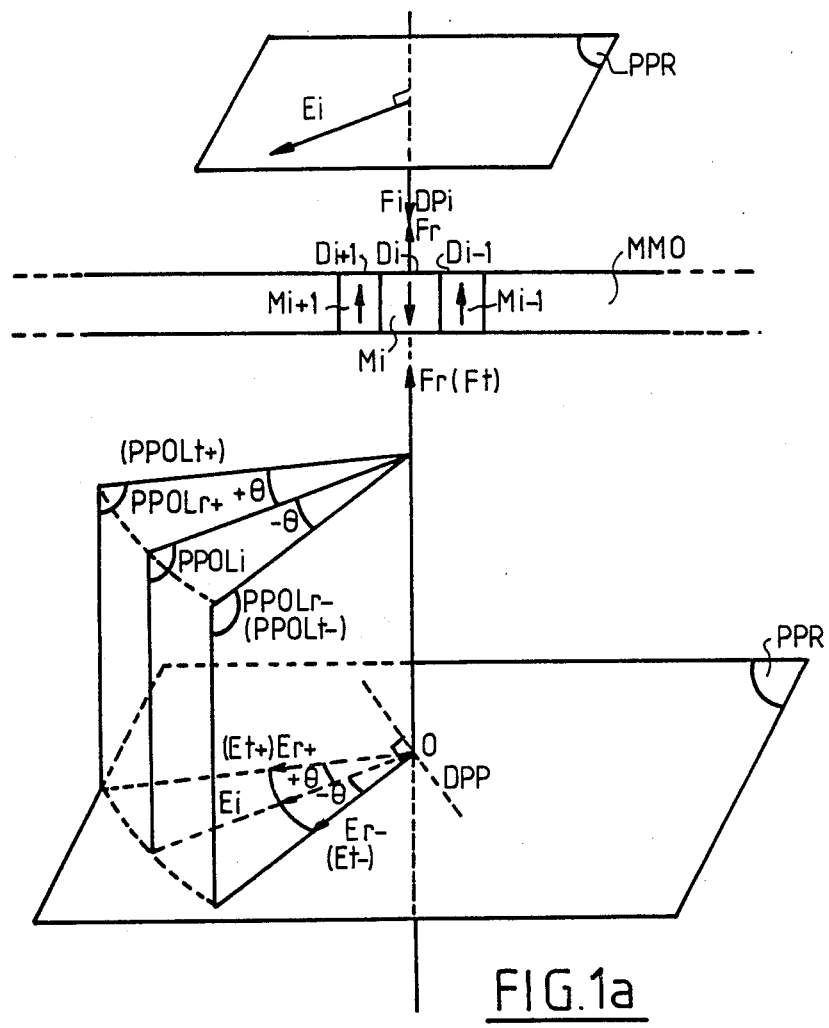
FIGS. 1, 1a, and 1b review the Kerr and Faraday magnetooptical effects.
Figure 1B:
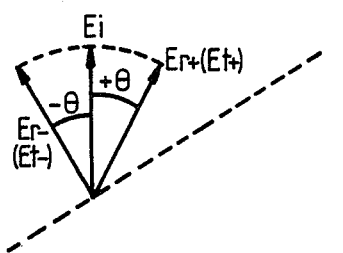
Figure 1:
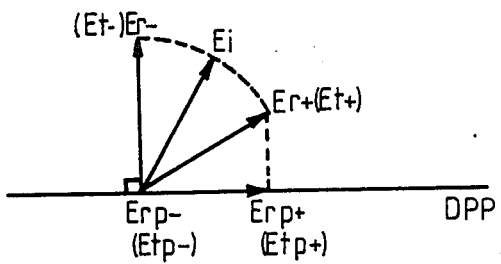

Turning first to FIGS. 1, 1a, and 1b a magnetooptical medium MMO is shown, which is assumed to be susceptible to the Kerr effect (although the logic is identical if a magnetooptical medium susceptible to the Faraday effect is assumed). It is supposed that the magnetooptical medium MMO has perpendicular magnetization; that is, its magnetization is normal to its surface. On this medium MMO, a great number of magnetic domains of small dimensions (on the order of several microns) have been recorded, only three of which have been shown in FIG. 1a for the sake of simplification. These domains are identified as $D_{i-1}$, $D_i$, and $D_{i+1}$, respectively. The respective magnetization vectors inside each of these domains are $M_{i-1}$, $M_1$, and $M_{i+1}$, respectively. An incident beam $F_i$ of rectilinear polarized light is sent perpendicular to the surface of the medium MMO, in a direction of propagation $DP_i$. In a plane of propagation PPR normal to the direction of propagation $DP_i$, the electrical field of the incident beam $F_i$ is $E_i$, and it has the direction indicated in FIGS. 1, 1a, and 1b, FIG. 1a being a three-dimensional view, while FIGS. 1b and 1 are projections on the plane PPR. The plane of polarization of the beam of light $F_i$ is defined by the direction of propagation $DP_i$ and by the vector $E_i$. This plane of polarization is designated by the symbol $PPOL_i$.

Upon being reflected on the medium MMO, the beam $F_i$ becomes the reflected beam $F_r$ if the medium MMO is susceptible to the Kerr effect (or the transmitted beam $F_t$ if MMO is susceptible to the Faraday effect). When the beam $F_i$ is reflected on a negatively magnetized magnetic domain such as the domain $D_i$, the reflected beam is such that its electrical field $E_{r-}$ (or $E_{t-}$ for the transmitted beam $F_t$) has rotated by an angle $-\theta$ with respect to the field $E_i$ of the incident beam $F_i$. The plane of polarization of the reflected beam $F_r$ (or $F_t$) is then $PPOL_{r-}$ (or $PPOL_{t-}$), since the dihedral angle between this plane and the plane $PPOL_i$ is also equal to $-\theta$.

Similarly, when the incident beam $F_i$ is reflected on a magnetic domain having positive magnetization, for example such as $D_{i+1}$, the reflected beam $F_r(F_t)$ is such that its electrical field $E_{r+}$ ($E_{t+}$) undergoes a rotation $+\theta$ relative to the electrical field $E_i$ of the beam $F_i$. The plane of polarization $PPOL_{r+}$ ($PPOL_{t+}$) then forms a dihedral angle equal to $+\theta$ with the plane $PPOL_i$. FIG. 1b provides a better view of the relative positions of the electrical fields $E_i$, $E_{r-}$, $E_{r+}$ (or $E_{t-}$, $E_{t+}$) of the incident and reflected beams $F_i$, $F_r$ ($F_t$) depending on whether $F_i$ is reflected onto a domain having negative or positive magnetization.

Review of Magnetooptical Reading

As has already been noted above, to read the data recorded on a magnetooptical medium such as MMO, it is necessary to determine the direction of magnetization in each of the domains $D_i$, which amounts to determining whether the electrical field vector has rotated by an angle of $-\theta$ or an angle of $+\theta$. To do this, a light analyzer is placed on the path of propagation of the reflected beam $F_r$ ($F_t$). Typically, this analyzer comprises a crystal having a direction of preferential transmission of the polarization of the light, for example DPP; this direction is shown in broken lines in FIG. 1b and in solid lines in FIG. 1c. The analyzer is placed such that the direction DDP is normal to the electrical field $E_{r-}$ (or $E_{t-}$).

At the output of the analyzer, light is collected that has a luminous intensity proportional to the square of the projection of the electrical field vector in the direction DPP.

Thus, if the beam $F_r$ ($F_t$) is coming from a domain of negative magnetization, the light received at the output of the analyzer has a luminous intensity proportional to the square of the modulus of the vector $E_{rp+}$ ($E_{tp+}$) that is the projection of the vector $E_{r+}$ ($E_{t+}$) in the direction DPP. It is thus apparent that if the beam $F_r$ ($F_t$) is coming from a positively magnetized domain, the light collected at the output of the analyzer will have a non-zero luminous intensity (the same reasoning applies for the signals furnished by the photoelectric transducers placed at the output of the light analyzer).

Review of Magnetooptical Reading Devices

Figure 2:
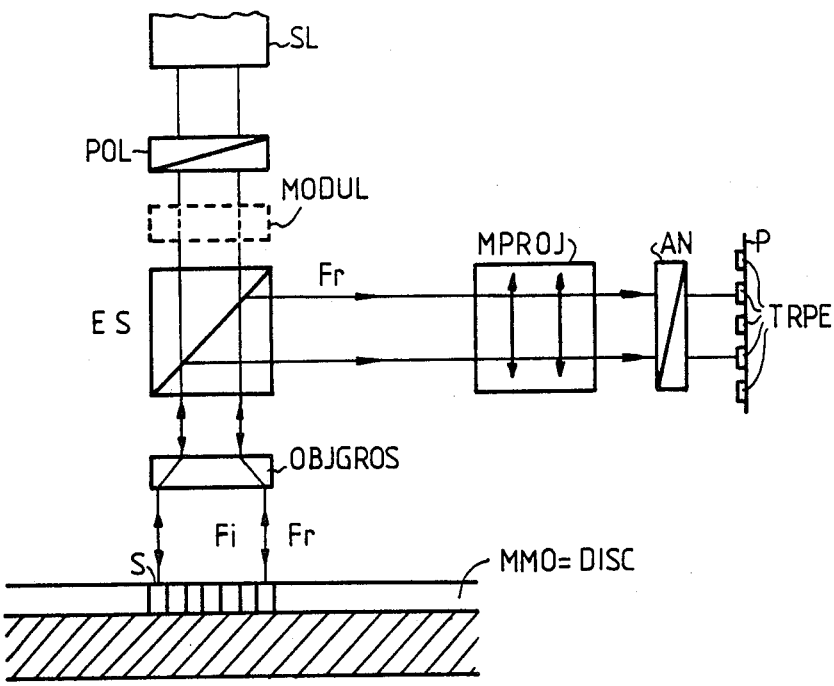
FIG. 2 is a schematic illustration of an optoelectronic reading device for the data contained in a magnetic medium such as that described in the above-mentioned U.S. Pat. No. 4,501,544.

Turning now to FIG. 2, the optoelectronic reading device the circuit diagram of which is shown here functions by the reading modalities illustrated by FIGS. 1a, 1b and 1.

It is assumed that the magnetooptical medium in which the data are to be read by the optoelectronic device of FIG. 2 is a magnetic disk DISC.

The various essential constituent elements of the optoelectronic reading device are as follows:
 a light source SL;
 a polarizer POL;
 a separator element ES for the incident beam $F_i$ and the reflected beam $F_r$;
 A magnifying lens OBJGROS with which the surface of the disk DISC can be illuminated over a surface area S such that a plurality of tracks (at least ten) and a plurality of magnetic domains within each track are observed simultaneously;
 projection means MPROJ;
 a light analyzer AN, a projection plane P where the image of the surface area illuminated by the incident beam $F_i$ is projected, the image being obtained by the projection means MPROJ, and the analyzer AN being disposed between the projection means and the plane P; and
 a set of photoelectronic transducers TRPE that furnish a set of electrical signals corresponding to the various magnetic domains of the disk DISC observed within the surface area illuminated by the beam $F_i$.

The assembly comprising the source SL and the polarizer POL emits a beam $F_i$ of parallel light that is relatively monochromatic and polarized.

The incident beam $F_i$ passes through the separator element ES and is sent through the magnifying lens OBJGROS normal to the surface of the disk DISC. The surface area S that is illuminated in this manner is substantially circular. In it, several tens, or even a hundred, tracks and several tens, or even a hundred, magnetic domains within each track can be observed.

The reflected beam $F_r$ passes through the magnifying lens OBJGROS and the separator element ES in succession, before passing through the projection means MPROJ. The light of the reflected beam $F_r$ passes through the light analyzer AN before being projected onto the plane P, where the photoelectronic transducers TRPE are disposed, which furnish a signal of zero or non-zero voltage depending on whether the magnetic domains encountered by the beam $F_i$ have negative or positive magnetization.

The set of signals furnished by the transducers TRPE is utilized, for example, in the manner described in U.S. Pat. No. 4,531,205.

Review of Modulation of Light Polarization and Modulator Devices

Figure 3A:
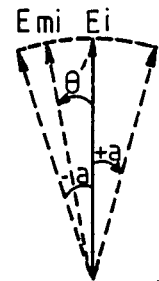
FIG. 3, including FIGS. 3a and 3b, reviews the modulation of the polarization of light.

As has been described above, in order to improve the signal-to-noise ratio of an optoelectronic device for reading data contained on a magnetooptical recording medium, the polarization of the incident beam $F_i$ is accordingly modulated. This is done by disposing a polarization modulating device MODUL, shown in broken lines in FIG. 2, between the polarizer POL and the separator element ES. As indicated in FIG. 3a, modulating the polarization of the light comprises making the electrical field vector oscillate periodically about its mean position $E_i$ (a trace of which is visible on the plane PPR in FIG. 3a). If the modulated electrical field vector is called $E_{mi}$, and if the angle between $E_{mi}$ and $E_i$ is called $\theta'$, then $\theta' = a \sin \omega t$, where $a$ is the amplitude of the oscillation of the modulated field $E_{mi}$.

Figure 3B:
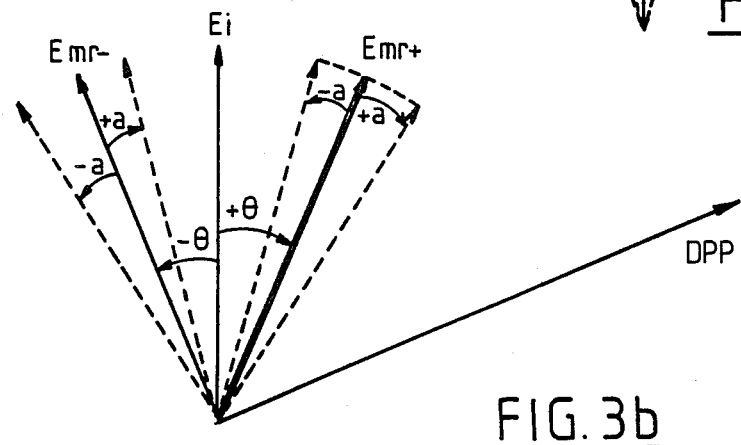
Figure 4:
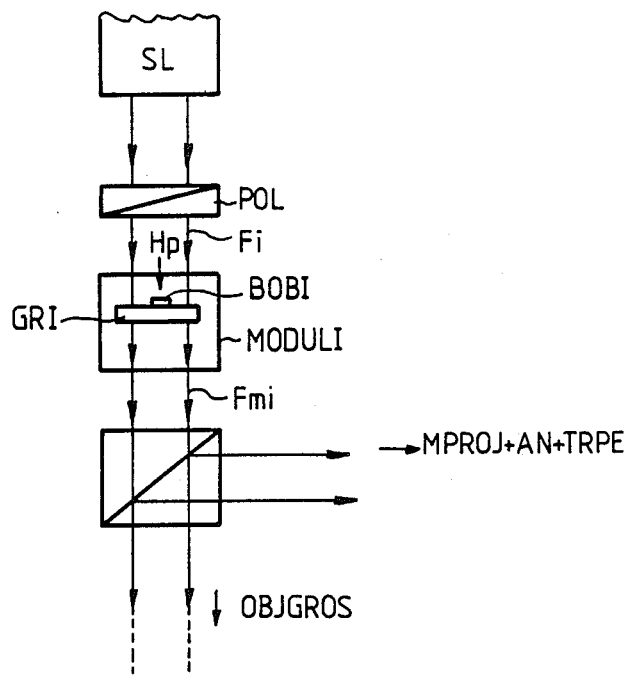
FIG. 4 shows how a light polarization modulating device according to the invention can be inserted in the optoelectronic reading device shown in FIG. 2.
Figure 5:
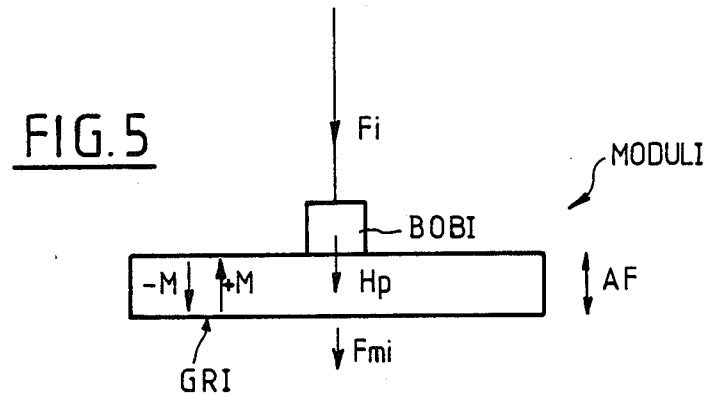
FIG. 5 is a view on a larger scale of the light polarization modulating device according to the invention shown in FIG. 4.

The effect of the reflection of the incident beam $F_i$ on the magnetooptical recording medium MMO is shown in FIG. 3b.

For a magnetic domain of negative magnetization, the electrical field vector of the reflected beam $F_r$, that is, $E_{mr-}$, undergoes a global rotation $-\theta + \theta'$, while the electric field vector $E_{mr+}$ of the reflected beam $F_r$, after reflection from a domain of positive magnetization, undergoes a global rotation $\theta + \theta'$. Thus as has been pointed out above, the major disadvantage of the light polarization modulators of the prior art is that they cannot modulate the polarization of the light except at relatively low frequencies, which are incompatible with the frequency of data reading on the tracks of the disks of magnetooptical memories, which are on the order of from several megahertz to several tens of a megahertz.

Modulator Device According to the Invention

The device for modulating the polarization of light according to the invention, shown in FIGS. 4–7, makes it possible to find a solution to the aforementioned problems.

One such modulator MODULI includes the following:
 a magnetooptical garnet GRI in thin monocrystalline layers, which is magnetically isotropic and the direction AF (see FIG. 5) of easy magnetization of the garnet is perpendicular to the plane of the garnet,
 a microcoil BOBI of very small diameter (less than one millimeter) applied to the garnet GRI. The incident beam $F_i$ of polarized light is sent at a normal to the surface of the garnet GRI, while the microcoil BOBI produces a periodic magnetic field $H_p$ having a pulsation $\omega$ that is likewise sent at a normal to the surface of the garnet. The oscillation frequency of the field $H_p$ is on the order of several tens of a megahertz and its amplitude is approximately 1/20 oersted.

When the magnetooptical garnet is subjected to the field $H_p$, its magnetization perpendicular to its surface oscillates between the amplitudes $-M$ and $+M$ (see FIG. 5) at a frequency near the oscillation frequency of the periodic magnetic field $H_p$. This signifies that the Faraday-effect magnetooptical rotation of the incident light beam $F_i$ will oscillate at the same frequency and that the modulated polarized light beam produced by the modulator MODULI will be such that its electrical field vector $E_{mi}$ will form an angle $\theta'$ with the electrical field vector of the incident beam $F_i$ (where $\theta' = a \sin \omega t$; see FIG. 3a).

The requirements the material comprising the magnetooptical optical garnet GRI must meet are as follows:

(1) low absorption to the wavelength of the incident reading beam $F_i$ (which is typically located in the visible spectrum, for example red), which implies that the thickness of the garnet be quite small, on the order of a few microns;

(2) sufficient Faraday rotation at the oscillation frequency of the modulated beam, on the order of approximately several tens of degrees. This rotation, symbolized as 0 eff, is called the dynamic Faraday rotation. It is demonstrated to be proportional to the static Faraday rotation $\theta F$ (the rotation obtained with a non-modulated polarized light) and depends first on the constant of anisotropy of the material comprising the garnet ($\theta_F$ increases if the anisotropy constant decreases) and second on the saturation magnetization $M_S$ along the direction of easy magnetization ($\theta_F$ increases if $M_S$ increases). The static rotation $\theta_F$ depends on the composition of the material itself. If requirements 1 and 2 above are met, then a signal of adequate amplitude, with a correct signal-to-noise ratio, will be obtained at the output of the photodetectors TRPE.

(3) a dynamic response enabling a modulation of the polarization of the light at a frequency at least two times higher than the frequency of the reading of data on a track of the magnetooptical disk, that is, a frequency of several tens of a megahertz. It is demonstrated that this makes a maximum signal-to-noise ratio possible. To have good dynamic response, the magnetooptical garnet GRI must be monocrystalline, must be made in thin layers, and must have a magnetization perpendicular to its plan (direction of easy magnetization perpendicular to its plane).

Magnetooptical garnets of this kind, in thin layers and meeting the above criteria, can be made by epitaxy in a liquid phase as described in the article, "The growth of bismuth iron garnet layers by liquid phase epitaxy", by W. Tolksdorf and C. P. Klages, under the heading "thin solid films" in the journal Electronics and Optics 114 (1984), pages 33–43.

To obtain the desired performance, the composition of the garnet, its crystallographic orientation and its thickness must be optimized.

Among the garnets that enable obtaining good performance, the garnets of the type $Y_{3-x} Bi_x Be_{5-y} Ga_y O_{12}$ can be named, which have a Faraday rotation $\theta_F$ on the order of several thousand degrees per centimeter of thickness, or the garnets of the type $(YGdPrBi)_3 (FeGa)_5 O_{12}$, which have a $\theta_F$ rotation greater than 10,000 degrees per centimeter of thickness. Either of these garnets has a low coercive field (of a few oersteds).

The microcoil BOBI is of very small dimensions, since its diameter is less than 1 mm (on the order of 0.8 mm in a preferred exemplary embodiment) and its length is a few millimeters (on the order of 2 mm in a preferred exemplary embodiment). The number of turns is on the order of about ten. Thus a coil is provided having low impedance for the frequencies in question (of a few ohms). It is clear that the use of a coil of very large dimensions would yield a higher self-inductance value L for the coil and consequently a greater impedance, which would cause self-inductance and ohmic losses of equal magnitude and would limit the frequency at which it is used.

Moreover, when a coil of small dimensions is used, the magnetic field can be concentrated on a zone of small dimensions on the garnet, on the order of the size of the beam of light $F_i$. The magnetic field $H_p$ produced by the microcoil has an amplitude of about 1/20 oersted, and in any case more than the coercive field of the magnetooptical garnet GRI, which under the best conditions makes it possible to assure the reversal of the magnetization M on the interior of the garnet.

Another advantage of using a coil of small dimensions is that the magnetic field produced has a direction that is practically normal to the surface of the garnet and consequently is parallel to the magnetization in the garnet, which further facilitates reversing the magnetization.

In a preferred embodiment of the invention, illustrated by FIG. 6, the garnet GRI is glued to the coil, which in turn is embedded inside a magnetically and electrically insulating substrate SI. The thickness of the insulator is on the order of the length of the microcoil BOBI. Since the substrate SI and the garnet GRI are substantially in the shape of a rectangle, the length $l_s$ of the substrate is greater than the length $l_g$ of the garnet GRI. This makes it possible to affix the modulator MODULI inside a parallelepiped-shaped case BI, as indicated in FIG. 7a, by means of the portion of the substrate extending beyond the garnet GRI.

The substrate SI is affixed inside one of the large walls $PARI_1$ of the parallelepiped comprising the case BI. On the inside of the wall $PARI_2$ of the case BI, parallel to the wall $PARI_1$, a window FEN is provided, the axis of symmetry Ax of which is the same as the axis of symmetry of the modulator MODULI perpendicular to the garnet, and which coincides with the axis of symmetry of the coil BOBI. This axis Ax coincides with the optical axis of the incident beam $F_i$. It also includes two connection terminals $CO_1$, $CO_2$ disposed on a wall perpendicular to the two walls $PARI_1$, $PARI_2$, enabling connection of the terminals (not shown, to simplify the drawing in FIGS. 7a and 7b) of the microcoil BOBI to a high-frequency signal generator associated with an amplifier.

Inside the case, a circuit comprising a capacitor C and a resistor R is also disposed, which being associated with the self-inductance L of the coil BOBI comprises a high-frequency resonant circuit that is tuned to the desired modulation.

What is claimed is:

1. A high-frequency modulator device for modulating polarized light comprising:
   (a) a source of polarized light (SL) emitting a beam of incident polarized light ($F_i$);
   (b) a generator (BOBI) which generates a periodic magnetic field $H_p$ having the pulsation $\omega$, said generator including a microcoil; and (c) a monocrystalline magnetooptical garnet (GRI) having thin layers that are parallel to a plane, said garnet being magnetically anisotropic, and having a direction of easy magnetization perpendicular to said plane, said garnet being disposed for receiving said beam of polarized light $F_i$ and said periodic magnetic field $H_p$, and thereby producing a beam of modulated polarized light ($F_{mi}$) that has undergone a rotation due to the magnetooptic effect O', equal to a sin ωt, of its plane of polarization with respect to the plane of polarization of the incident beam $F_i$, where a=amplitude of the modulated field, and
t=time, said microcoil being mechanically fixed to said magnetooptical garnet in such manner as to produce a magnetic field perpendicular to said thin layers of said garnet, said garnet having a symmetry axis parallel to the optical axis of the polarized light beam ($F_i$).

2. A modulator device as defined by claim 1, wherein the magnetooptical garnet (GRI) is susceptible to the Faraday magnetooptical effect and has a low absorption to the wavelength of the incident beam and its dynamic response permits modulation of the polarization of the light at a frequency on the order of several tens of a megahertz.

3. A modulator device as defined by claim 2, wherein the chemical formula of said magnetooptical garnet (GRI) is of the type $Y_{3-x} Bi_x Fe_{5-y} Ga_y O_{12}$.

4. A modulator device as defined by claim 2, wherein the chemical formula of said garnet (GRI) is of the type $(Y\ Gd\ Pr\ Bi)_3 (Fe\ Ga)_5 O_{12}$.

5. A modulator device as defined by claim 1 wherein said thin layers of said garnet are at most a few microns thick and are obtained by liquid phase epitaxy.

6. A modulator device as defined by claim 2 wherein said thin layers of said garnet are at most a few microns thick and are obtained by liquid phase epitaxy.

7. A modulator device as defined by claim 3 wherein said thin layers of said garnet are at most a few microns thick and are obtained by liquid phase epitaxy.

8. A modulator device as defined by claim 4 wherein said thin layers of said garnet are at most a few microns thick and are obtained by liquid phase epitaxy.

* * * * *

UNITED STATES PATENT AND TRADEMARK OFFICE
CERTIFICATE OF CORRECTION

PATENT NO. : 4,810,065

DATED : March 7, 1989

INVENTOR(S) : Valette et al

It is certified that error appears in the above-identified patent and that said Letters Patent is hereby corrected as shown below:

On the title page:

[75] "Catherine Gueugnon" should be --Catherine (Gueugnon) Chaniot--.

Signed and Sealed this

Third Day of April, 1990

Attest:

HARRY F. MANBECK, JR.

*Attesting Officer*  *Commissioner of Patents and Trademarks*